US010091408B2

(12) United States Patent
Nonaka

(10) Patent No.: US 10,091,408 B2
(45) Date of Patent: Oct. 2, 2018

(54) IMAGING APPARATUS AND METHOD OF RECOGNIZING TARGET OBJECT

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/487,441

(22) Filed: Apr. 14, 2017

(65) Prior Publication Data

US 2017/0280045 A1 Sep. 28, 2017

Related U.S. Application Data

(63) Continuation of application No. PCT/JP2015/080051, filed on Oct. 26, 2015.

(30) Foreign Application Priority Data

Oct. 31, 2014 (JP) ................................ 2014-222378
Oct. 16, 2015 (JP) ................................ 2015-204749

(51) Int. Cl.

*H04N 5/232* (2006.01)
*G03B 37/02* (2006.01)
*G03B 15/04* (2006.01)

(52) U.S. Cl.

CPC ..... *H04N 5/23212* (2013.01); *G03B 15/0431* (2013.01); *G03B 15/0436* (2013.01); *G03B 37/02* (2013.01); *H04N 5/23219* (2013.01)

(58) Field of Classification Search

CPC ........... H04N 5/23212; H04N 5/23219; G03B 15/0431; G03B 15/0436

See application file for complete search history.

(56) References Cited

U.S. PATENT DOCUMENTS 6,734,911 B1 5/2004 Lyons
6,977,676 B1 12/2005 Sato et al.
(Continued)

FOREIGN PATENT DOCUMENTS

EP 1331807 7/2003
JP H11-069342 3/1999
(Continued)

OTHER PUBLICATIONS

"Search Report of Europe Counterpart Application", dated Jul. 31, 2017, p. 1-p. 14.

(Continued)

*Primary Examiner* — Antoinette Spinks
(74) *Attorney, Agent, or Firm* — JCIPRNET

(57) ABSTRACT

The imaging apparatus includes: an imaging optical system that is formed of a wide-angle optical system and a telephoto optical system having a common optical axis; a directional sensor; a panning/tilting mechanism that rotates an imaging section, which includes the imaging optical system and the directional sensor, in horizontal and vertical directions; and an image acquisition section that respectively acquires a wide-angle image, and a telephoto image, and a first target object is detected from a wide-angle image, the panning/tilting mechanism is controlled on the basis of information about a position of the detected first target object within the wide-angle image, and image recognition is performed on a telephoto image, when the first target object is positioned at the center of the wide-angle image, thereby recognizing the first target object or a second target object.

20 Claims, 13 Drawing Sheets

(56) References Cited

U.S. PATENT DOCUMENTS

| | | | | |
|---|---|---|---|---|
| 9,924,084 | B2 * | 3/2018 | Ono | H04N 5/2259 |
| 2006/0012681 | A1 | 1/2006 | Fujii | |
| 2009/0179982 | A1 | 7/2009 | Yanagisawa et al. | |
| 2010/0265331 | A1 | 10/2010 | Tanaka | |
| 2011/0234749 | A1 | 9/2011 | Alon | |
| 2012/0189263 | A1 | 7/2012 | Kato et al. | |
| 2014/0168498 | A1 * | 6/2014 | Ono | G03B 11/00 348/335 |
| 2015/0338606 | A1 | 11/2015 | Ono | |

FOREIGN PATENT DOCUMENTS

| | | |
|---|---|---|
| JP | 2000-341574 | 12/2000 |
| JP | 2003-510666 | 3/2003 |
| JP | 2004072240 | 3/2004 |
| JP | 2005-189532 | 7/2005 |
| JP | 2006-033224 | 2/2006 |
| JP | 2007-116666 | 5/2007 |
| JP | 2009-128527 | 6/2009 |
| JP | 2009-244369 | 10/2009 |
| WO | 2014129216 | 8/2014 |

OTHER PUBLICATIONS

"Written Opinion of the International Searching Authority (Form PCT/ISA/237)" of PCT/JP2015/080051, dated Dec. 22, 2015, with English translation thereof, pp. 1-13.

"International Search Report (Form PCT/ISA/210) of PCT/JP2015/080051", dated Dec. 22, 2015, with English translation thereof, pp. 1-4.

Joseph Ford, "Photonic Systems Integration Laboratory", Internet <URL:http://psilab.ucsd.edu/research/TelescopicContact Lens/main.html>, the University of California at San Diego.

"Office Action of Japan Counterpart Application," with machine English translation thereof, dated Dec. 6, 2017, p. 1-p. 10.

* cited by examiner (A) [WIDE-ANGLE IMAGE]

(B) [TELEPHOTO IMAGE]

IMAGING APPARATUS AND METHOD OF RECOGNIZING TARGET OBJECT

CROSS-REFERENCE TO RELATED APPLICATIONS

This application is a Continuation of PCT International Application No. PCT/JP2015/080051 filed on Oct. 26, 2015, which claims priority under 35 U.S.C. § 119(a) to Patent Application No. 2014-222378 filed in Japan on Oct. 31, 2014, and Patent Application No. 2015-204749 filed in Japan on Oct. 16, 2015, all of which are hereby expressly incorporated by reference into the present application.

BACKGROUND OF THE INVENTION

1. Field of the Invention

The present invention relates to an imaging apparatus and a method of recognizing a target object. Particularly, the present invention relates to an imaging apparatus, which is capable of simultaneously capturing a wide-angle image and a telephoto image, and a method of recognizing a target object.

2. Description of the Related Art

In the past, JP1999-69342A (JP-H11-69342A) and JP2006-33224A describe an imaging apparatus capable of simultaneously capturing a wide-angle image and a telephoto image.

Both the systems described in JP1999-69342A (JP-H11-69342A) and JP2006-33224A comprise: a wide-angle camera that captures a wide-angle image; and a telephoto camera that is mounted on an electric pan head (panning/tilting device) and captures a telephoto image. In addition, in a basic configuration of the system, the wide-angle camera detects a tracking target object from the captured wide-angle image, and the telephoto camera automatically tracks the target object by controlling rotation of the electric pan head on the basis of information about a position of the detected target object within the wide-angle image, thereby performing telephoto imaging.

Further, a tracking system in which a camera is mounted on a panning/tilting mount, and which controls the panning/tilting mount such that it captures the target object subjected to tracking at the center of the field of view of the camera has been proposed. The camera comprises an optical system in which an axis of a narrow-angle lens portion of a central circular part coincides with an axis of a wide-angle lens portion of an annular part surrounding the central circular part, and an image sensor having a central zone, in which a narrow-angle image is formed by the narrow-angle lens portion, and a circumferential zone in which a wide-angle image is formed by the wide-angle lens portion (JP2003-510666A).

Thereby, even if the target object drops out from an angle of view of a narrow-angle lens portion, the target object can be captured by using the wide-angle lens portion. Thus, tracking dropout does not occur.

Further, a contact lens, through which the wide-angle and telephoto images can be observed, was proposed by Joseph Ford at the University of California at San Diego (UCSD) ("Photonic Systems Integration Laboratory", the Internet <URL: http://psilab.ucsd.edu/research/Telescopic Contact Lens/main.html>).

By using the configuration of the contact lens in a camera, it is possible to obtain wide-angle and telephoto images.

SUMMARY OF THE INVENTION

Both systems described in JP1999-69342A (JP-H11-69342A) and JP2006-33224A have basic configurations in which the system comprises two independent cameras which are the wide-angle camera and the telephoto camera. Hence, there are problems in that the price of the system is high and the size thereof is also large. Further, the optical axes of the wide-angle camera and the telephoto camera are not the same, and parallax occurs between a wide-angle image and a telephoto image which are captured separately. For this reason, if there is no parallax correction using distance information of the target object, the target object cannot be captured reliably by the telephoto camera. Furthermore, since the wide-angle camera is fixed, if the target object moves beyond the angle of view of the wide-angle image, a problem arises in that the target object cannot be captured by the telephoto camera.

On the other hand, in the tracking system described in JP2003-510666A, a problem arises in that it is difficult to design an optical system that smoothly connects a narrow-angle image, which is captured through a narrow-angle lens portion of a central circular part, and a wide-angle image (a fish-eye image in which distortion is not corrected) which is captured through a wide-angle lens portion of an annular part. Therefore, a problem arises in that it is difficult to perform tracking of the target object at the boundary part between the narrow-angle image and the wide-angle image.

Further, on an image sensor, overlapping (butting) between the narrow-angle image and the wide-angle image occurs. In order to avoid the above-mentioned problem, if an optical blocking and/or separating mechanism is provided, the wide-angle image is formed in an annular shape, and the center part of the wide-angle image is vacant. Accordingly, imaging cannot be performed.

Furthermore, in a case where the central circular part is formed as a telephoto lens and the annular part is formed as a wide-angle lens, it is difficult to design an optical system that smoothly connects the telephoto image and wide-angle image which are captured through these lenses. In this situation, at the boundary between the telephoto image and the wide-angle image, a region, in which an image is not captured, appears.

The contact lens described in "Photonic Systems Integration Laboratory", the Internet <URL: http://psilab.ucsd.edu/research/Telescopic Contact Lens/main.html> is able to solve the problem of parallax between the wide-angle image and the telephoto image. However, in order to separately obtain two images which are wide-angle and telephoto images, a switching shutter is necessary. For this reason, a complex system is formed. Further, it is not possible to obtain both images at the same time, and thus information of the wide-angle image is not acquired while the telephoto image is being acquired. Accordingly, there is a problem in that precision of tracking is lowered.

The present invention has been made in consideration of the above-mentioned situation, and its target object is to provide an imaging apparatus capable of easily capturing a desired target object through a telephoto optical system and performing image recognition on the target object, which is captured by the telephoto optical system, on the basis of a telephoto image including the target object, and a method of recognizing the target object.

In order to achieve the above-mentioned target object, according to an aspect of the present invention, there is provided an imaging apparatus comprising an imaging optical system that is formed of a wide-angle optical system and a telephoto optical system having a common optical axis; a directional sensor that has a plurality of pixels constituted of photoelectric conversion elements two-dimensionally arranged and that respectively pupil-divides rays incident through the wide-angle and telephoto optical systems so as to selectively receive the rays; a panning/tilting mechanism that rotates an imaging section, which includes the imaging optical system and the directional sensor, in horizontal and vertical directions; an image acquisition section that respectively acquires a wide-angle image, for which light is received from the directional sensor through the wide-angle optical system, and a telephoto image for which light is received from the directional sensor through the telephoto optical system; a target object detection section that detects a first target object from the wide-angle image by performing image processing on the wide-angle image acquired by the image acquisition section; a panning/tilting control section that controls the panning/tilting mechanism on the basis of information about a position of the first target object, which is detected by the target object detection section, within the wide-angle image such that the first target object is positioned at the center of the wide-angle image; and an image recognition section that performs image recognition on the telephoto image, which is acquired by the image acquisition section, when the panning/tilting control section controls the panning/tilting mechanism such that the first target object is positioned at the center of the wide-angle image, and recognizes the first target object or a second target object close to the first target object.

According to the aspect of the present invention, it is possible to simultaneously acquire the wide-angle image and the telephoto image having the common optical axis through the imaging section (single imaging section) including the directional sensor and the imaging optical system having the above-mentioned configuration. If the first target object is detected on the basis of the acquired wide-angle image and the panning/tilting mechanism is controlled on the basis of the information about the position of the detected first target object within the wide-angle image such that the first target object is positioned at the center of the wide-angle image, the wide-angle optical system and the telephoto optical system have the common optical axis, and therefore the first target object or the second target object close to the first target object can be set within the telephoto image. That is, by controlling the panning/tilting mechanism such that the first target object is positioned at the center of the wide-angle image on the basis of the wide-angle image, it is possible to easily capture the first target object or the second target object close to the first target object through the telephoto optical system. In addition, by performing image recognition on the basis of the telephoto image captured in a state where the first target object or the second target object close to the first target object is enlarged, it is possible to satisfactorily perform image recognition on the first target object or the second target object.

In the imaging apparatus according to another aspect of the present invention, it is preferable that in a case where there is a plurality of the first target objects, the image recognition section preferentially recognizes the first target object closest to the imaging apparatus.

In the imaging apparatus according to still another aspect of the present invention, it is preferable that if a plurality of target objects is detected from the wide-angle image, the target object detection section detects a target object closest to the imaging apparatus as the first target object.

It is preferable that the imaging apparatus according to still another aspect of the present invention further comprises a moving object detection section that detects a moving object, of which an image is recognized by the target object detection section on the basis of the wide-angle images continuously acquired by the image acquisition section, as the first target object. In addition, it is preferable that if the target object detection section detects a plurality of target objects and the moving object detection section detects a moving object, the image recognition section preferentially recognizes the detected moving object. In a case where the plurality of target objects is detected and one of the plurality of target objects is detected as a moving object, the moving object is preferentially recognized.

In the imaging apparatus according to still another aspect of the present invention, the image recognition section extracts a face image of a person from the telephoto image, and performs face recognition (face authentication) for specifying an individual on the basis of the extracted face image. Since the face image enlarged through the telephoto image can be acquired, it is possible to enhance accuracy of face authentication.

In the imaging apparatus according to still another aspect of the present invention, the image recognition section extracts an image of a license plate of a vehicle from the telephoto image, and performs image recognition for specifying a number of the vehicle on the basis of the extracted image of the license plate. Since it is possible to acquire the image of the license plate enlarged through the telephoto image, it is possible to enhance accuracy of image recognition (character recognition) for specifying the number of vehicles.

It is preferable that the imaging apparatus according to still another aspect of the present invention further comprises an output section that outputs recognition information of the first target object or the second target object recognized by the image recognition section.

It is preferable that the imaging apparatus according to still another aspect of the present invention further comprises a moving object detection section that detects a moving object, of which an image is recognized by the target object detection section on the basis of the wide-angle images continuously acquired by the image acquisition section, as the first target object; and an image holding section that holds the telephoto image for a predetermined time period, if the moving object detection section detects the first target object as a moving object, when the recognition information of the first target object or the second target object is output. If the moving object is displayed through the telephoto image, image blurring becomes large. Therefore, in a case where the recognition information of the first target object or the second target object is output, the telephoto image is held for the predetermined time period. Thereby, image blurring is prevented from occurring by holding the telephoto image.

In the imaging apparatus according to still another aspect of the present invention, it is preferable that the image recognition section extracts a face image of a person from the telephoto image, or extracts an image of a license plate of a vehicle from the telephoto image. In addition, it is preferable that if the image recognition section extracts the face image of the person from the telephoto image, or extracts the image of the license plate of the vehicle from the telephoto image, the output section trims the face image or the image of the license plate extracted from the telephoto image, and outputs only the trimmed image to a display section. If the moving object is displayed through the telephoto image, image blurring becomes large. Therefore, in a case where the recognition information of the first target object or the second target object is output, from the telephoto image, only the trimmed image is displayed on the display section. Thereby, image blurring is prevented from occurring.

In the imaging apparatus according to still another aspect of the present invention, it is preferable that the output section outputs the recognition information to at least one of an information recording section, which records the recognition information, or a display section which displays the recognition information. Thereby, the recognition information of the first target object or the second target object can be displayed on the display section, or can be recorded in the information recording section.

It is preferable that the imaging apparatus according to still another aspect of the present invention further comprises an image recording section that records at least the telephoto image in the wide-angle and telephoto images acquired by the image acquisition section. As a result, it is possible to confirm the desired first target object or second target object later through the telephoto image recorded by the image recording section.

In the imaging apparatus according to still another aspect of the present invention, the target object detection section may perform image recognition on the first target object on the basis of the wide-angle image acquired by the image acquisition section, and detects the first target object. For example, in a case where the first target object is a person, by recognizing the person or a face of the person, it is possible to detect the first target object.

In the imaging apparatus according to still another aspect of the present invention, it is preferable that the target object detection section performs image processing on the wide-angle images continuously acquired by the image acquisition section in real time, and continuously detects the first target object from the wide-angle images. In addition, it is preferable that the panning/tilting control section continuously controls the panning/tilting mechanism on the basis of information about a position of the first target object, which is continuously detected by the target object detection section, in the wide-angle image such that the first target object is kept at the center of the wide-angle image. Thereby, it is possible to track the first target object, and thus it is possible to more appropriately perform image recognition by acquiring the plurality of telephoto images during the tracking.

In the imaging apparatus according to still another aspect of the present invention, it is preferable that the wide-angle optical system is a central optical system that has a circular shape, and the telephoto optical system is an annular optical system that is disposed concentrically around the central optical system. By using the wide-angle optical system and the telephoto optical system which are rotationally symmetric, no parallax occurs between the wide-angle image and the telephoto image, and it is possible to acquire the wide-angle image and the telephoto image which are excellent in image quality as compared with an optical system which is not rotationally symmetric.

In the imaging apparatus according to still another aspect of the present invention, it is preferable that the annular optical system has a reflective optical system that reflects rays twice or more. Thereby, it is possible to shorten the dimension of the annular optical system in the optical axis direction. As a result, it is possible to reduce the size of the imaging section.

In the imaging apparatus according to still another aspect of the present invention, the telephoto optical system may be a central optical system that has a circular shape, and the wide-angle optical system may be an annular optical system that is disposed concentrically around the central optical system.

It is preferable that the imaging apparatus according to still another aspect of the present invention further comprises a focus adjustment section that performs focus adjustment of the telephoto optical system. Since the telephoto optical system has a depth of field lower than that of the wide-angle optical system and blurring tends to occur in the telephoto optical system, the focus adjustment is performed thereon. It should be noted that the focus adjustment section may be provided also in the wide-angle optical system, and the wide-angle optical system may perform panning and focusing without the focus adjustment section in the wide-angle optical system.

In the imaging apparatus and a method of recognizing a target object according to still another aspect of the present invention, the directional sensor may have a micro lens array or a light blocking mask that functions as pupil division means.

According to still another aspect of the present invention, there is provided the method of recognizing the target object by using an imaging apparatus including an imaging optical system that is formed of a wide-angle optical system and a telephoto optical system having a common optical axis, a directional sensor that has a plurality of pixels constituted of photoelectric conversion elements two-dimensionally arranged and that respectively pupil-divides rays incident through the wide-angle and telephoto optical systems so as to selectively receive the rays, a panning/tilting mechanism that rotates an imaging section, which includes the imaging optical system and the directional sensor, in horizontal and vertical directions, and an image acquisition section that respectively acquires a wide-angle image, for which light is received from the directional sensor through the wide-angle optical system, and a telephoto image for which light is received from the directional sensor through the telephoto optical system. The method comprises: detecting a first target object from the wide-angle image by performing image processing on the wide-angle image acquired by the image acquisition section; controlling the panning/tilting mechanism on the basis of information about a position of the detected first target object within the wide-angle image such that the first target object is positioned at the center of the wide-angle image; and performing image recognition on the telephoto image, which is acquired by the image acquisition section, when the first target object is positioned at the center of the wide-angle image, and recognizing the first target object or a second target object close to the first target object.

According to the present invention, optical axis directions of the wide-angle image and the telephoto image, which are captured through the directional sensor and the imaging optical system including the wide-angle optical system and the telephoto optical system having the common optical axis, coincide with each other. Therefore, the desired target object is detected on the basis of the wide-angle image having a wide angle of view, and the panning/tilting mechanism is controlled such that the detected target object is positioned at the center of the wide-angle image. Thereby, the target object can be set within the telephoto image having a narrow angle of view. By controlling the panning/tilting mechanism in such a manner and performing image recognition on the captured telephoto image, it is possible to satisfactorily perform image recognition on the target object of which the image is captured in an enlarged state.

DESCRIPTION OF THE PREFERRED EMBODIMENTS

Hereinafter, referring to accompanying drawings, preferred embodiments of an imaging apparatus and n method of recognizing a target object according to the present invention will be described.

<Appearance of Auto-Tracking Imaging Apparatus>

Figure 1:
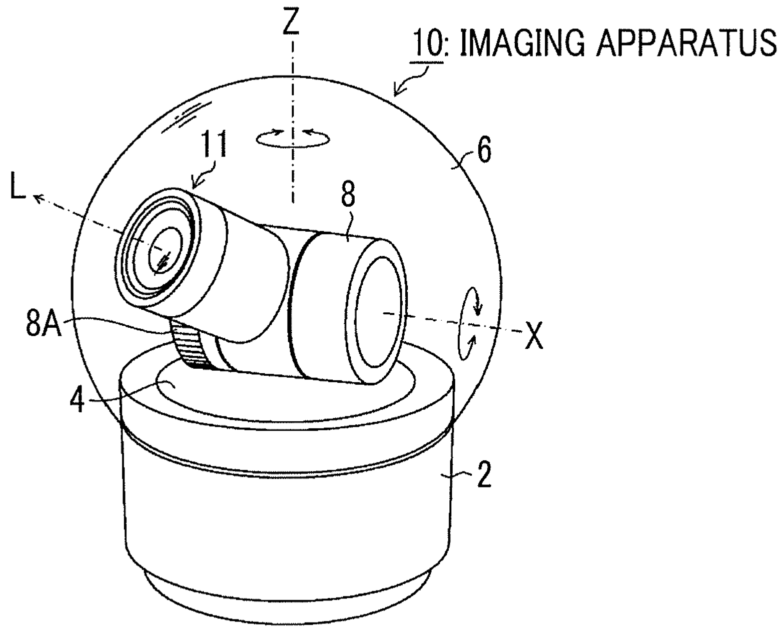
FIG. 1 is a perspective view of an appearance of an imaging apparatus and a method of recognizing a target object according to the present invention.

FIG. 1 is a perspective view of an appearance of an imaging apparatus according to the present invention.

As shown in FIG. 1, an imaging apparatus 10 mainly has an apparatus main body 2, an imaging section 11, a panning/tilting device 30 (FIG. 5), and a dome cover 6 that covers the imaging section 11.

The panning/tilting device 30 has a pedestal 4 and a holding section 8 that is fixed onto the pedestal 4 and rotatably holds the imaging section 11.

The pedestal 4 is disposed to be rotatable about the axis of the vertical direction Z of the apparatus main body 2. A pan driving section 34 (FIG. 5) rotates about the axis of the vertical direction Z.

The holding section 8 has a gear 8A that is provided on the axis the same as the axis of the horizontal direction X, and transfers the driving force from the tilt driving section 36 (FIG. 5) through the gear 8A, thereby rotating (tilting) the imaging section 11 in the up-down direction.

The dome cover 6 is a vibration-proof and drip-proof cover. It is preferable that the dome cover 6 has a spherical shell shape with a certain thickness at which an intersection point between the axis of the horizontal direction X and the axis of the vertical direction Z is set as a center of a curvature thereof without change in optical performance of the imaging section 11, regardless of a direction of an optical axis L of the imaging section 11.

Further, it is preferable that a tripod attaching section (such as a tripod screw hole) not shown in the drawing is provided on the rear surface of the apparatus main body 2.

[Configuration of Imaging Section]

Figure 2:
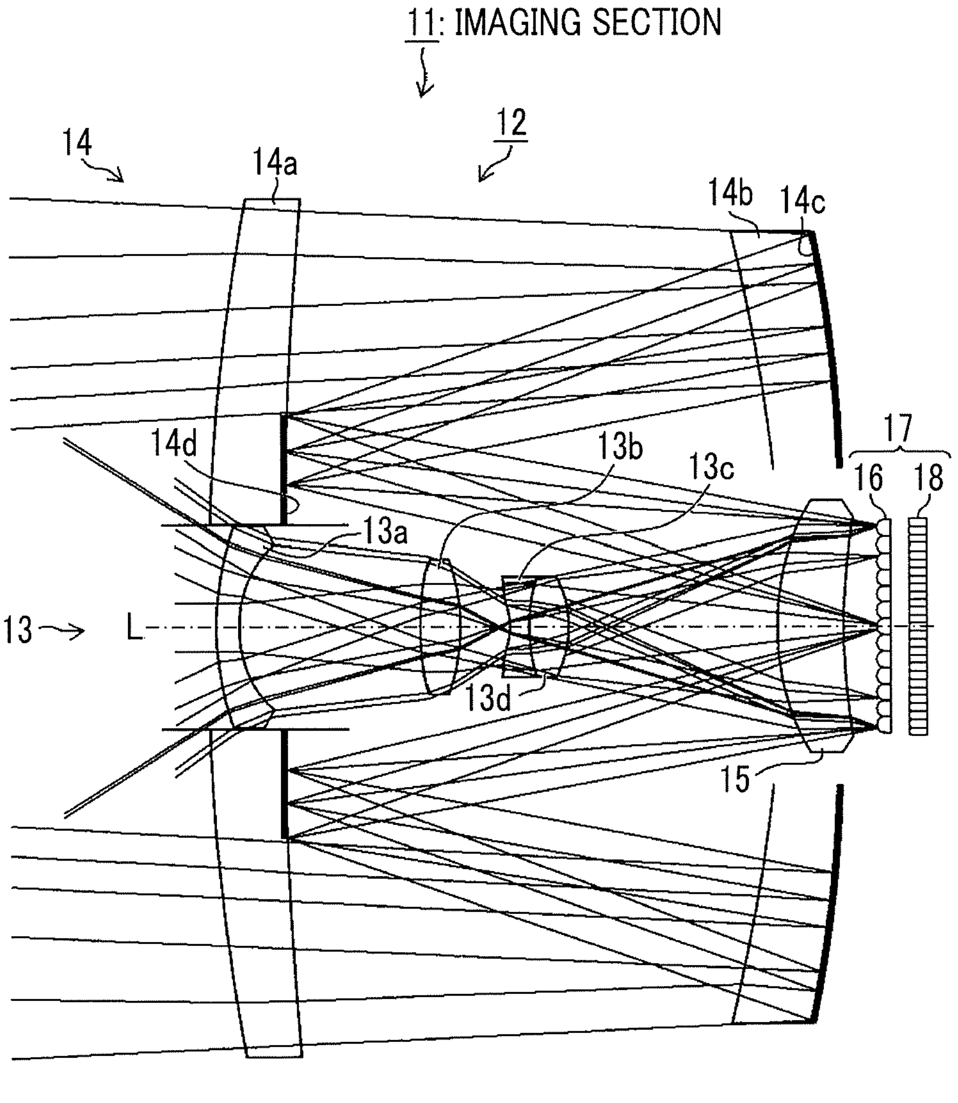
FIG. 2 is a cross-sectional view illustrating a first embodiment of an imaging section in the imaging apparatus and the method of recognizing the target object.

FIG. 2 is a sectional view illustrating a first embodiment of the imaging section 11 of the imaging apparatus 10.

As shown in FIG. 2, the imaging section 11 includes an imaging optical system 12 and a directional sensor 17.

<Imaging Optical System>

The imaging optical system 12 includes a wide-angle optical system 13 and a telephoto optical system 14 having a common optical axis L. The wide-angle optical system 13 is a central optical system that has a circular shape centered on the optical axis L. The telephoto optical system 14 is an annular optical system that is centered on the optical axis L and that is disposed concentrically around the central optical system (wide-angle optical system 13).

The wide-angle optical system 13 is a wide-angle lens including a first lens 13*a*, a second lens 13*b*, a third lens 13*c*, a fourth lens 13*d*, and a common lens 15, and forms a wide-angle image on a micro lens array 16 constituting the directional sensor 17.

The telephoto optical system 14 is a telephoto lens including a first lens 14*a*, a second lens 14*b*, a first reflection mirror 14*c* as a reflective optical system, a second reflection mirror 14*d*, and a common lens 15, and forms a telephoto image on a micro lens array 16. Rays, which are incident through the first lens 14*a* and the second lens 14*b*, are reflected twice by the first reflection mirror 14*c* and the second reflection mirror 14*d*, and thereafter pass through the common lens 15. The rays are bent by the first reflection mirror 14*c* and the second reflection mirror 14*d*, whereby a length of the telephoto optical system 14 having a long focal length in the optical axis direction is shortened. It should be noted that the telephoto optical system 14 of this embodiment has two mirrors including the first reflection mirror 14*c* and the second reflection mirror 14*d*, but the present invention is not limited to this, and the system may have three or more reflection mirrors (reflective optical systems).

<Directional Sensor>

The directional sensor 17 includes the micro lens array 16 and an image sensor 18.

Figure 3:
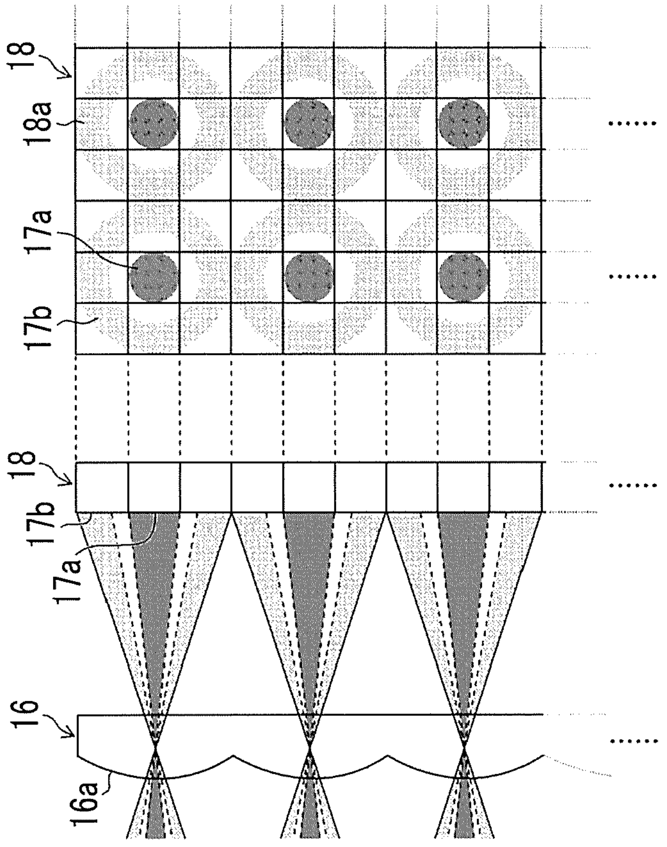
FIG. 3 is an enlarged view of principal sections of a micro lens array and an image sensor shown in FIG. 2.

FIG. 3 is an enlarged view of principal sections of the micro lens array 16 and the image sensor 18.

The micro lens array 16 is configured such that multiple micro lenses (pupil imaging lenses) 16*a* are two-dimensionally arranged. Distances between the micro lenses 16*a* in the horizontal and vertical directions correspond to distances between three light receiving cells 18*a* as photoelectric conversion elements of the image sensor 18. That is, each micro lens 16*a* of the micro lens array 16 is formed to correspond to positions of two light receiving cells in each direction of the horizontal and vertical directions.

Further, each micro lens 16*a* of the micro lens array 16 forms a central pupil image (first pupil image) 17*a* having a circular shape and annular pupil image (second pupil image) 17*b*, which correspond to the wide-angle optical system 13 and the telephoto optical system 14 of the imaging optical system 12, on the light receiving cells 18*a* in a corresponding light receiving region of the image sensor 18.

According to the micro lens array 16 and the image sensor 18 shown in FIG. 3, 3×3 light receiving cells 18*a* having a lattice (square lattice) shape are allocated for each one micro lens 16*a* of the micro lens array 16. Hereinafter, a light receiving cell group (3×3 light receiving cells 18*a*) corresponding to one micro lens 16*a* and one micro lens 16*a* is referred to as a unit block.

The central pupil image 17*a* is formed only on the light receiving cell 18*a* at the center of the unit block, and the annular pupil image 17*b* is formed on the eight light receiving cells 18*a* at the periphery of the unit block.

According to the imaging section 11 having the above-mentioned configuration, as described later, it is possible to simultaneously acquire the wide-angle image and the telephoto image of which the optical axis directions coincide with each other.

[Embodiment of Image Sensor]

Figure 4:
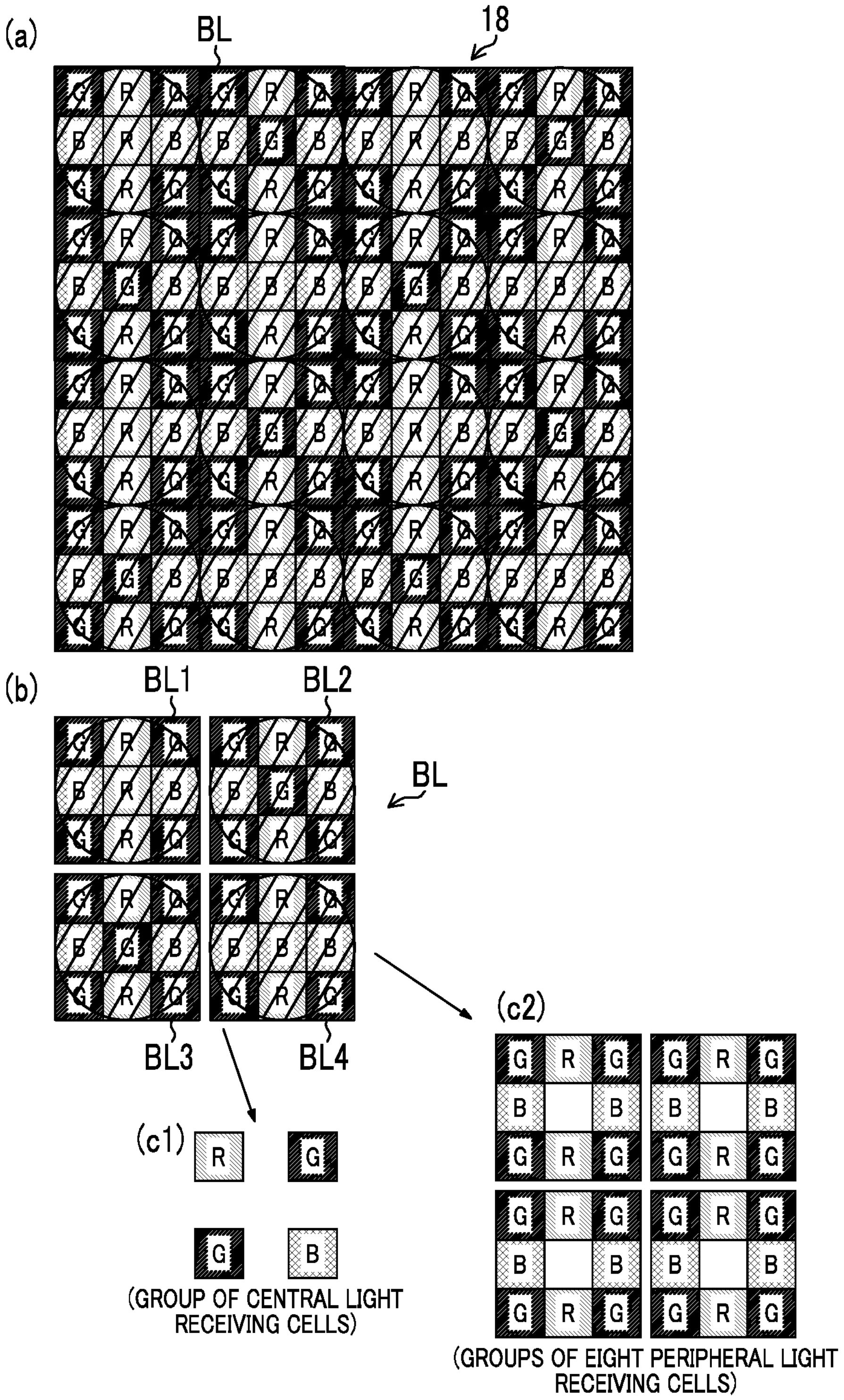
FIG. 4 is a diagram illustrating a color filter array and the like which are disposed in the image sensor.

FIG. 4 is a diagram illustrating a color filter array that is disposed on the image sensor 18. In FIG. 4, the micro lens array 16 is omitted, but the regions indicated by circles represents unit blocks each including 3×3 light receiving cells on which pupil images are formed by the respective micro lenses 16*a* of the micro lens array 16.

As shown in (a) of FIG. 4, the color filter array formed of color filters disposed on the respective light receiving cells is provided on an imaging surface of the image sensor 18.

The color filter array is formed of color filters (hereinafter referred to as R, G, and B filters) which have three primary colors and through which rays with respective wavelength regions of red (R), green (G), and blue (B) are transmitted. Then, any one of the RGB filters is disposed on each light receiving cell. Hereinafter, the light receiving cell, on which the R filter is disposed, is referred to as an “R light receiving cell”, the light receiving cell, on which the G filter is disposed, is referred to as an “G light receiving cell”, and the light receiving cell, on which the B filter is disposed, is referred to as an “B light receiving cell”.

The color filter array shown in (a) of FIG. 4 is configured as follows: 6×6 light receiving cells are set as a basic block BL (a block indicated by a large frame of (a) of FIG. 4, and shown in (b) of FIG. 4), and the basic blocks BL are repeatedly arranged in the horizontal and vertical directions.

As shown in (b) of FIG. 4, the basic block BL includes four unit blocks BL1 to BL4.

(c1) of FIG. 4 shows a group of central light receiving cells (light receiving cells on which rays passing through the wide-angle optical system 13 shown in FIG. 3 are incident) of the four unit blocks BL1 to BL4. (c2) of FIG. 4 shows groups of eight peripheral light receiving cells (light receiving cells on which rays passing through the telephoto optical system 14 shown in FIG. 3 are incident).

As shown in (c1) of FIG. 4, the image of the group of the central light receiving cells is formed of mosaic images having a Bayer array. Thereby, by performing the demosaic processing on the mosaic images having the Bayer array, it is possible to obtain a color image.

In contrast, as shown in (c2) of FIG. 4, the groups of the central light receiving cells and the eight peripheral light receiving cells of the unit blocks BL1 to BL4 include all the RGB light receiving cells (R, G, and B light receiving cells) in the eight light receiving cells, and the RGB light receiving cells are arranged with the same pattern regardless of the unit blocks BL to BL4.

Specifically, G light receiving cells are disposed on the four light receiving cells at four corners of each of the unit blocks BL1 to BL4, R light receiving cells are disposed on the two upper and lower light receiving cells with the central light receiving cell interposed therebetween, and B light receiving cells are disposed on the two left and right light receiving cells with the central light receiving cell interposed therebetween.

Further, the R light receiving cells, the G light receiving cells, and the B light receiving cells are respectively positioned to be symmetric to each other with respect to the central light receiving cell (center) of each unit block. Thereby, by using output signals of the RGB light receiving cells in the unit blocks, after the demosaic processing (synchronization processing) of each unit block, one pixel (a pixel value of RGB) constituting an image can be generated.

That is, by obtaining an average value of the output signals (pixel values) of the four G light receiving cells within the unit block, it is possible to acquire a pixel value of the G pixel at the center of the unit block (single micro lens). Likewise, by obtaining an average value of the pixel values of the two R light receiving cells and an average value of the pixel values of the two B light receiving cells within the unit block, it is possible to acquire respective pixel values of the R and B pixels at the center of the unit block.

Thereby, the telephoto image, which is generated by a group of the peripheral eight light receiving cells of each unit block and corresponds to the telephoto optical system 14 (annular optical system), can be subjected to demosaic processing on the basis of pixel values of the RGB light receiving cells within the unit block. Thus, by interpolating the pixel values of the light receiving cells of the peripheral unit blocks, it is not necessary to generate pixel values of pixels in a specific wavelength region, and there is no deterioration in resolution (substantial number of pixels) of the output image.

<Internal Configuration of Imaging Apparatus>

Figure 5:
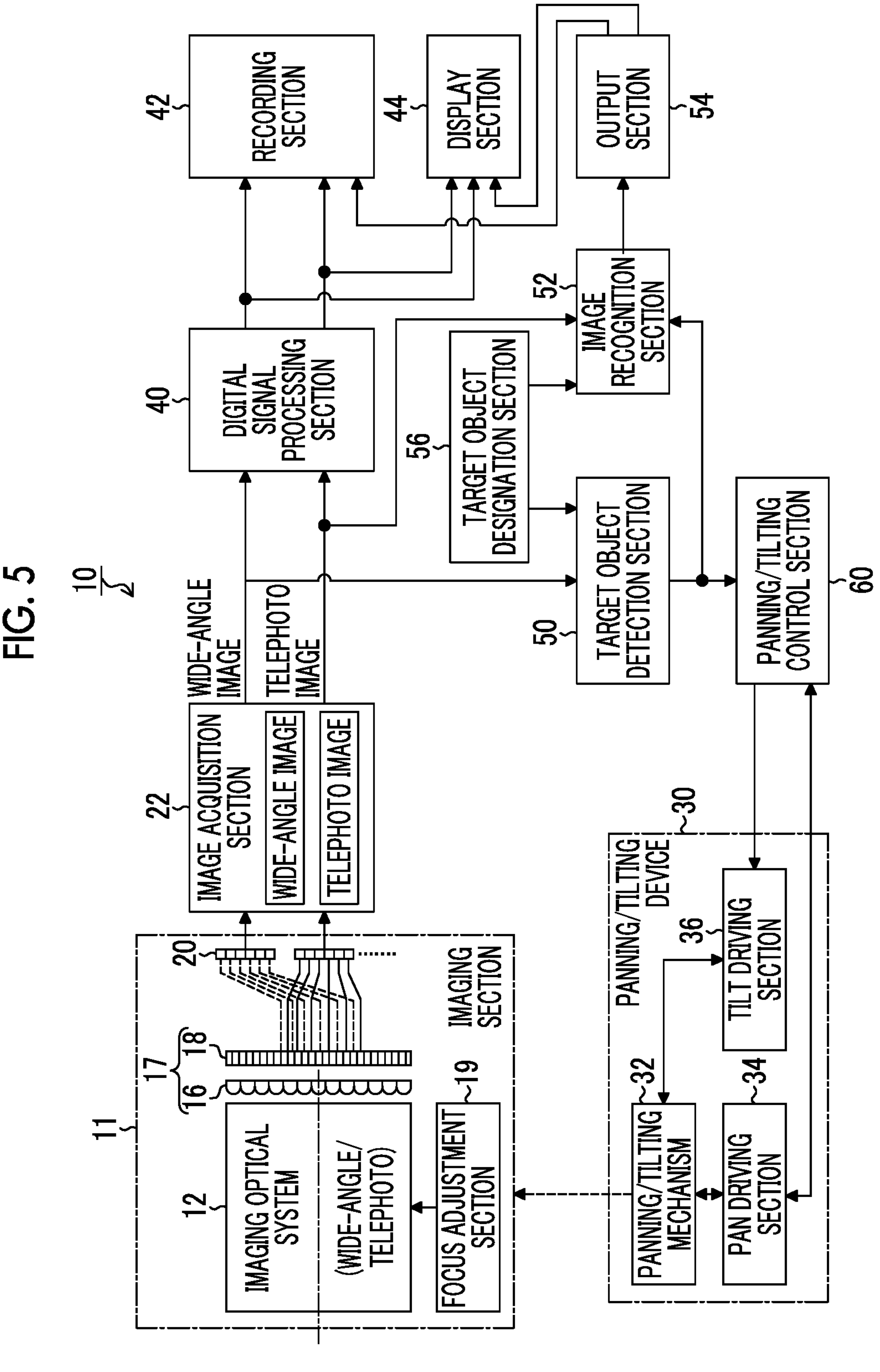
FIG. 5 is a block diagram illustrating an embodiment of an internal configuration of the imaging apparatus.

FIG. 5 is a block diagram illustrating an embodiment of an internal configuration of the imaging apparatus 10.

As shown in FIG. 5, the imaging apparatus 10 comprises the imaging section 11 that is formed of the imaging optical system 12, which has the wide-angle optical system 13 and the telephoto optical system 14 described in FIG. 2 and the directional sensor 17 which has the micro lens array 16 and the image sensor 18 described in FIGS. 3 and 4(*a*) to 4(*c*2).

It is preferable that the imaging section 11 comprises a focus adjustment section 19 that performs focus adjustment of the telephoto optical system 14 (annular optical system). The focus adjustment section 19 can be constituted of, for example, a voice coil motor that moves an entire or partial optical system of the telephoto optical system 14 in the optical axis direction, and the like. Further, determination as to whether or not the telephoto image is in an in-focus state can be performed on the basis of a contrast of a focus detection region of the telephoto image. However, the focus adjustment method is not limited to this. In addition, in the wide-angle optical system 13 (central optical system), the focus adjustment section may be separately provided. Alternatively, the wide-angle optical system 13 may be configured so as to be in deep focus (pan focus) without the focus adjustment section.

The panning/tilting device (electric pan head) 30 comprises, as shown in FIG. 1, a panning mechanism that rotates the imaging section 11 in the horizontal direction (panning direction) of the apparatus main body 2, and a panning/tilting mechanism (hereinafter referred to as a "panning/tilting mechanism") 32 that rotates the imaging section 11 in the vertical direction (tilting direction), a pan driving section 34, a tilt driving section 36, and the like. The panning/tilting mechanism 32 has a home position sensor that detects a reference position of a rotation angle (pan angle) in the panning direction and a home position sensor that detects a reference position of an inclination angle (tilt angle) in the tilting direction.

Each of the pan driving section 34 and the tilt driving section 36 has a stepping motor and a motor driver, outputs a driving force to a panning/tilting mechanism 32, and drives the panning/tilting mechanism 32.

The imaging section 11 captures time-series wide-angle and telephoto images through the imaging optical system 12 and the directional sensor 17, and converts subject images into signal voltages (or electric charges) of which amounts correspond to an amount of incident light. The subject images are formed on light receiving surfaces of the light receiving cells (photoelectric conversion elements) of the directional sensor 17 (image sensor 18) through the imaging optical system 12.

The signal voltages (or electric charges) accumulated in the image sensor 18 can be stored in the light receiving cells themselves or provided capacitors. The stored signal voltages (or electric charges) are read in conjunction with selection of positions of the light receiving cells by a method of using complementary metal oxide semiconductor (CMOS) type image sensors (so-called CMOS sensors) based on an X-Y address system. Further, the image sensor 18 is not limited to a CMOS type image sensor, and a charge coupled device (CCD) type image sensor may be used.

Pixel signals, which indicate wide-angle images of groups of the central light receiving cells corresponding to the wide-angle optical system 13, and pixel signals, which indicate telephoto images of groups of the eight peripheral light receiving cells corresponding to the telephoto optical system 14, can be read from the image sensor 18. Further, pixel signals, which indicate the wide-angle and telephoto images, are continuously read from the image sensor 18, at a predetermined frame rate (for example, 24 fps (frame per second), 30 fps, or 60 fps).

The pixel signal (voltage signals), which is read from the image sensor 18, for each light receiving cell is sampled and held through correlated double sampling processing (processing of acquiring precise pixel data by taking a difference between a feed-through component level and a signal component level included in the output signal of each light receiving cell in order to reduce noise (particularly thermal noise) included in the sensor output signal). Then, the signal is amplified, and thereafter added to an analog/digital (A/D) converter 20. The A/D converter 20 converts the pixel signals, which are sequentially input, into digital signals, and outputs the signals to an image acquisition section 22. In addition, the A/D converter may be built into the MOS-type sensor. In this case, the digital signals are output directly from the image sensor 18.

The image acquisition section 22 selects the positions of the light receiving cells of the image sensor 18 and reads the pixel signals, thereby simultaneously or selectively acquiring the pixel signals, which indicate the wide-angle image, and the pixel signals which indicate the telephoto image.

That is, by selectively reading the pixel signals of the light receiving cells of the image sensor 18 onto which the central pupil images 17*a* are incident, it is possible to acquire the pixel signals (pixel signals indicating mosaic images having a Bayer array) indicating a wide-angle image of the light receiving cells (each of which is the central light receiving cell of the 3×3 light receiving cells) each of which corresponds to each one micro lens. In contrast, by selectively reading the pixel signals of the light receiving cells of the image sensor 18 onto which the annular pupil images 17*b* are incident, it is possible to acquire the pixel signals (pixel signals indicating mosaic images having a Bayer array) indicating a telephoto image of the light receiving cells (which are the peripheral light receiving cells of the 3×3 light receiving cells) of which every eight light receiving cells correspond to each one micro lens.

In addition, all the pixel signals may be read from the image sensor 18 and temporarily stored in the buffer memory, and groups of the pixel signals of the two images of the wide-angle and telephoto images may be divided from the pixel signals stored in the buffer memory.

The pixel signal, which indicates the wide-angle image acquired by the image acquisition section 22, is output to each of a digital signal processing section 40 and a target object detection section 50. The pixel signal, which indicates the telephoto image acquired by the image acquisition section 22, is output to each of the digital signal processing section 40 and an image recognition section 52. For example, the image acquisition section 22, the digital signal processing section 40, the target object detection section 50, the image recognition section 52, and a panning/tilting control section 60 are formed by a single CPU or a plurality of central processing units (CPUs), and are operated through loading of programs stored in a recording section, which is not shown in the drawing and is provided in the imaging apparatus 10, on the corresponding CPUs.

The digital signal processing section 40 performs predetermined signal processing, such as offset processing, gamma correction processing, and demosaic processing for the signals of the RGB mosaic images, on the input digital pixel signals (sequential R, G, and B signals of RGB points). Here, the demosaic processing is processing of calculating information of all colors for each pixel from the RGB mosaic images corresponding to a color filter array of a single-plate-type image sensor 18, and is also referred to as synchronization processing. For example, in the case of the image sensor 18 having color filters of three colors of RGB, the demosaic processing is processing of calculating information of all colors of RGB for each pixel from the mosaic images having RGB colors.

That is, the demosaic processing section included in the digital signal processing section 40 does not have the R and B light receiving cells at the positions of the G light receiving cells of the wide-angle image (mosaic images having a Bayer array). Hence, the R and B signals of the R and B light receiving cells around the G light receiving cells are separately interpolated, and the R and B signals at the positions of the G light receiving cells are generated. Likewise, at the positions of the R light receiving cells of the mosaic images, there are no G and B light receiving cells. Hence, the G and B signals of the G and B light receiving cells around the R light receiving cells are separately interpolated, and the G and B signals at the positions of the R light receiving cells are generated. Further, at the positions of the B light receiving cells of the mosaic images, there are no G and R light receiving cells. Hence, the G and R signals of the G and R light receiving cells around the B light receiving cells are separately interpolated, and the G and R signals at the positions of the B light receiving cells are generated.

In contrast, as shown in (c2) of FIG. 4, the telephoto image is formed of the mosaic images of which every eight (eight peripheral blocks of 3×3 unit blocks) images correspond to one micro lens 16*a*, and the eight light receiving cells include all RGB color information pieces (of the R, G, and B light receiving cells). Accordingly, the demosaic processing section is able to generate a single pixel (RGB pixel value) constituting the image, on which the demosaic processing is performed, for each unit block, by using the output signals of the eight light receiving cells in the unit block.

Specifically, the demosaic processing section, which performs the demosaic processing on the mosaic images of the telephoto image, calculates an average value of the pixel values of the four G light receiving cells in the unit block, thereby calculating a G pixel value of the pixel at the center position of the unit block (single micro lens). Likewise, the demosaic processing section calculates an average value of the pixel values of the two R light receiving cells and an average value of the pixel values of the two B light receiving cells in the unit block, thereby calculating R and B pixel values of the pixels at the center positions of the respective unit blocks.

The demosaic image of the telephoto image of two demosaic images of the wide-angle and telephoto images generated by the demosaic processing section is subjected to demosaic processing by using the output signals of the eight light receiving cells in the unit block. Accordingly, the resolution of the demosaic image is substantially higher than that of the demosaic image of the wide-angle image which is subjected to demosaic processing by using (interpolating) the output signals of the light receiving cells of the peripheral unit blocks.

Further, the digital signal processing section 40 performs RGB/YC conversion or the like which generates a luminance signal Y and color difference signals Cb and Cr from the RGB color information pieces (R, G, and B signals) on which demosaic processing is performed by the demosaic processing section, thereby generating image signals for recording and displaying a moving image indicating the wide-angle and telephoto images with the predetermined frame rate.

The image signals, which indicate the wide-angle and telephoto images processed by the digital signal processing section 40, are respectively output to a recording section 42 and a display section 44 corresponding to the image recording section. The recording section 42 records the image signals for recording a moving image indicating the wide-angle and telephoto images processed by the digital signal processing section 40 in a recording medium (such as a hard disk or a memory card). In addition, the recording section 42 may record only the telephoto image.

The display section 44 includes a liquid crystal display and the like, and displays the wide-angle and telephoto images on the basis of the image signals for displaying the moving image indicating the wide-angle and telephoto images processed by the digital signal processing section 40. Further, instead of the display section 44, an image may be displayed on a monitor which is connected to the imaging apparatus 10. In addition, the display section 44 may reproduce the wide-angle and telephoto images on the basis of the image signals recorded in the recording section 42.

Meanwhile, the target object detection section 50 performs image processing on the wide-angle images, which are continuously acquired by the image acquisition section 22, in real time, detects a desired target object (first target object) within the wide-angle image, and outputs information about a position (positional information that indicates the position of the first target object on an XY coordinate system where a center position of the wide-angle image is set as an origin) of the detected first target object within the wide-angle image to the panning/tilting control section 60.

Examples of a method of detecting the first target object in the target object detection section 50 include: a moving object detection method of detecting a moving object as the first target object; a method of detecting a specific target object through a target object recognition technology typified by a technology of performing person face recognition; and a pattern recognition method of detecting only a specific shape (such as a person shape or a vehicle shape) on the basis of a pattern recognition technology.

The moving object detection method is a method of using a differential image such as a difference (difference between frames) between two previous and subsequent wide-angle images among time-line wide-angle images acquired by the image acquisition section 22. In addition, the differential image is an image that is generated by the moving object (target object), and the target object detection section 50 is able to set a barycentric position of the differential image as a position of the moving object (target object) within the wide-angle images.

The target object detection method based on target object recognition is a method in which features of a specific target object in a viewing direction are registered as a target object dictionary (a face dictionary in a case where the target object is a face) in advance and a target object is recognized by comparing the target object dictionary with a clipped image while changing a position or a size of the target object from the captured image.

A target object designation section 56 is a section that sets a target object to be detected by the target object detection section 50 and designates a method of detecting the target object, and the target object detection section 50 detects the target object (first target object) which is set by the target object designation section 56. The target object designation section 56 includes a touch panel, may receive an input of the target object from a user, and may receive an input of the target object designation issued from a computer connected to the imaging apparatus 10. In addition, in a case where the first target object detected by the target object detection section 50 is a specific target object (one type of a target object), the target object designation section 56 is not necessary.

The information about the position of the target object (first target object), which is detected by the target object detection section 50, within the wide-angle image is output to the panning/tilting control section 60.

The panning/tilting control section 60 is a section that controls the panning/tilting device 30 on the basis of the information about the position of the first target object within the wide-angle image which is input from the target object detection section 50 as described above. The panning/tilting control section 60 controls the panning/tilting mechanism 32 (that is, a direction of imaging performed by the imaging section 11) through the pan driving section 34 and the tilt driving section 36 such that the position of the first target object within the wide-angle image of the first target object is moved to the center position (a position on the optical axis) of the wide-angle image.

Under the control of the panning/tilting mechanism 32, it is possible to capture an image while automatically tracking the first target object (such as a person or a face) such that the target object is at the center of the wide-angle image.

Figure 6:
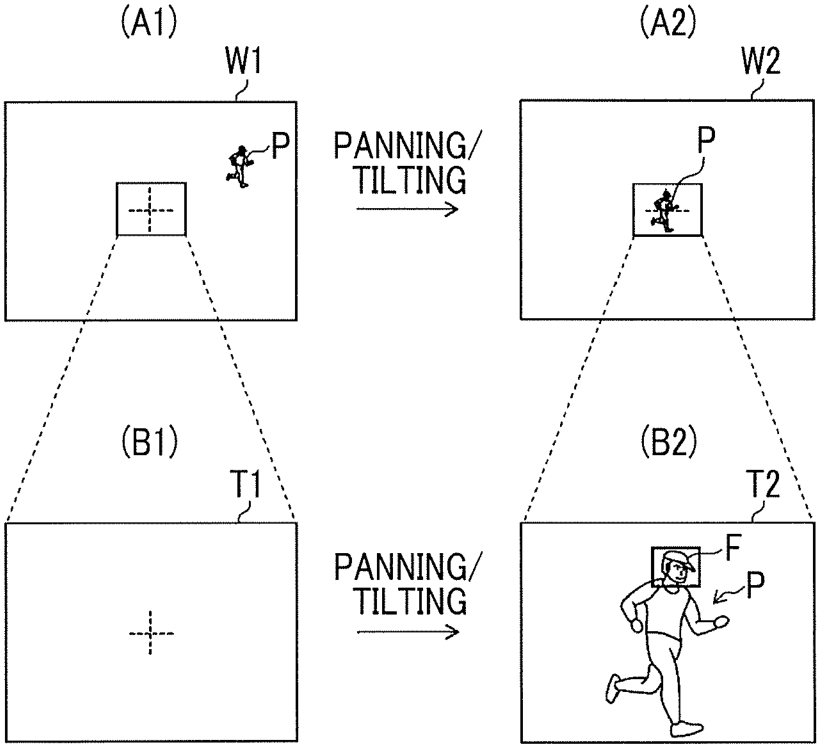
FIG. 6 is a diagram illustrating an example of a wide-angle image and a telephoto image which are captured simultaneously.

FIG. 6 is a diagram illustrating the wide-angle and telephoto images which are captured simultaneously. (A1) of FIG. 6 and (B1) of FIG. 6 respectively show wide-angle and telephoto images before start of the panning/tilting control, and (A2) of FIG. 6 and (B2) of FIG. 6 respectively show the wide-angle and telephoto images before the panning/tilting control (during auto-tracking).

In an example shown in FIG. 6, a first target object, which is detected by the target object detection section 50 in the wide-angle image, is a person P, and the panning/tilting control section 60 controls the panning/tilting device 30 such that the person P detected by the target object detection section 50 is at the center of the wide-angle image.

At a time point before the start of the panning/tilting control shown in (A1) of FIG. 6 and (B1) of FIG. 6, the person P is within a wide-angle image W1, but not within a telephoto image T1.

As shown in (A2) of FIG. 6 and (B2) of FIG. 6, the panning/tilting control is performed, and thereby the person P can be captured on the basis of a telephoto image T2 if the person P is positioned at the center of a wide-angle image W2. The reason for this is that the wide-angle optical system 13 and the telephoto optical system 14 of the imaging optical system 12 shown in FIG. 2 has the common optical axis L.

Returning to FIG. 5, the image recognition section 52 performs image recognition on the telephoto image which is acquired by the image acquisition section 22 when the first target object is positioned at the center of the wide-angle image, and recognizes the first target object or the second target object close to the first target object.

The image recognition section 52 is able to determine whether or not the first target object is positioned at the center of the wide-angle image, on the basis of the information about the position of the first target object, which is detected by the target object detection section 50, within the wide-angle image. In addition, the case where the first target object is positioned at the center of the wide-angle image includes a case where the target object is positioned at substantially the center of the wide-angle image. This means that the first target object is positioned at the center of the wide-angle image to the extent that the first target object is captured through the telephoto image.

Further, a target object to be subjected to image recognition or information, which indicates recognition contents, is added to the image recognition section 52 from the target object designation section 56. Thus, the image recognition section 52 performs image recognition on the telephoto image, which is acquired by the image acquisition section 22, when the first target object is positioned at the center of the wide-angle image (that is, when the first target object is captured through the telephoto image), and performs image recognition of the first target object or the second target object close to the first target object within the telephoto image, on the basis of the information which is input from the target object designation section 56.

Here, the second target object close to the first target object is defined as a part of the first target object or a target object adjacent to the first target object. For example, in a case where the first target object is a "person", the second target object corresponds to a "face" of the "person". Further, as for an example of the image recognition, in a case where the information indicating the recognition contents which are input from the target object detection section 50 is "face authentication", the image recognition section 52 extracts a face image from the telephoto image acquired by the image acquisition section 22, and performs face recognition for specifying an individual on the basis of the extracted face image. In addition, in a case where the image recognition section 52 performs only specific image recognition (one type of image recognition), the target object designation section 56 is not necessary, and the face image, which is recognized by the image recognition section 52, and the like is a result of the recognition. Furthermore, for extracting the face image, a known algorithm such as eigenface using main component analysis or linear discriminant analysis may be used.

The recognition result (recognition information of the first target object or the second target object) of the image recognition performed by the image recognition section 52 is output to the recording section 42 in the imaging apparatus 10 or an external information recording section (not shown in the drawing) from an output section 54, and is recorded in the recording section 42 and the like. Further, the recognition result of the image recognition performed by the image recognition section 52 is output to the display section 44 in the imaging apparatus 10 or an extra display section (not shown in the drawing) from the output section 54, and is displayed on the display section 44 and the like.

<Method of Recognizing Object>

Figure 7:
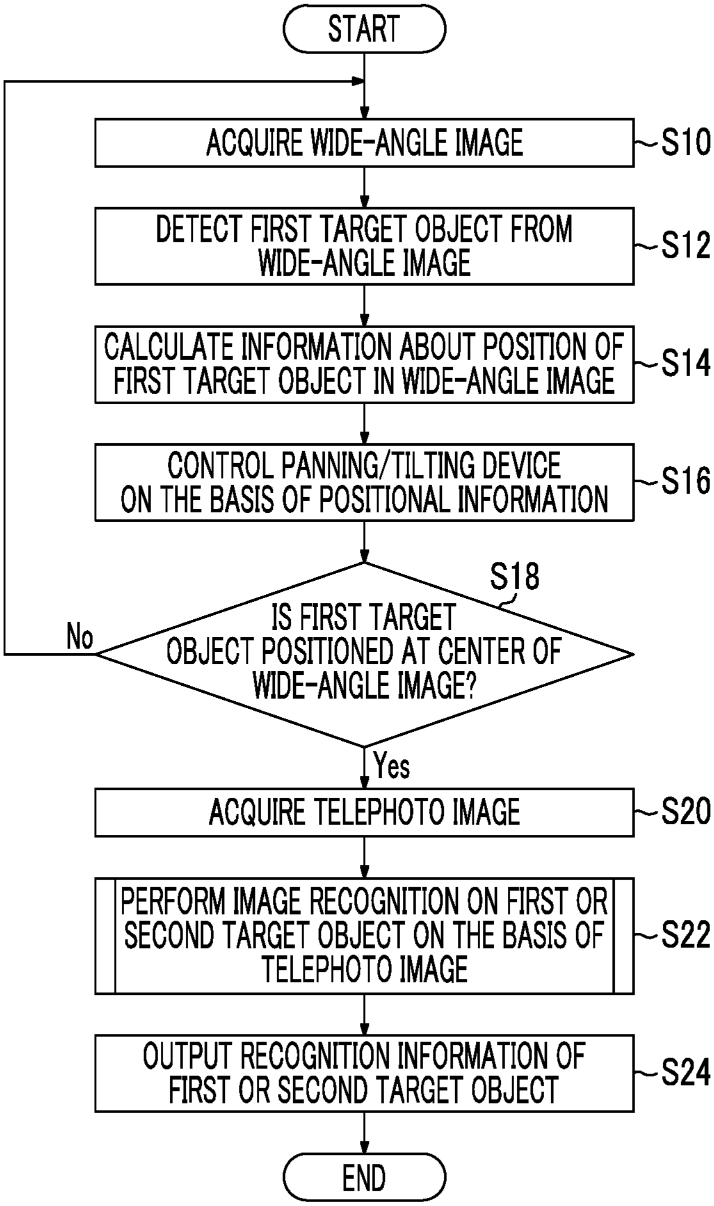
FIG. 7 is a flowchart illustrating an embodiment of the method of recognizing the target object according to the present invention.

FIG. 7 is a flowchart illustrating an embodiment of the method of recognizing the target object according to the present invention.

In FIG. 7, the image acquisition section 22 acquires a wide-angle image among the wide-angle and telephoto images simultaneously captured by the imaging section 11 (step S10). The target object detection section 50 detects the first target object from the wide-angle image acquired by the image acquisition section 22 (step S12). In addition, the first target object may be a target object which is designated by the target object designation section 56, and may be a specific target object which is set in advance. Further, the first target object can be detected in a method of detecting a moving object on the basis of the differential image of the difference between the frames or the like in a case where the first target object is the moving object, can be detected through the target object recognition technology typified by the technology of performing person face recognition in a case where the first target object is a "face" of a person, and can be detected using the pattern recognition technology in a case where the first target object has a specific shape.

The target object detection section 50 calculates information about the position of the detected first target object within the wide-angle image (step S14).

Subsequently, the panning/tilting control section 60 inputs the information about the position of the first target object within the wide-angle image from the target object detection section 50, and controls the panning/tilting device 30 such that the target object is at the center of the wide-angle image on the basis of the input positional information (step S16).

Next, the image recognition section 52 determines whether or not the first target object is positioned at the center of the wide-angle image (step S18). In a case where the first target object is not positioned at the center of the wide-angle image (in a case of "No"), returning to step S10, processing from steps S10 to S18 is repeated.

In a case where the first target object is positioned at the center of the wide-angle image (in a case of "Yes"), the image recognition section 52 acquires a telephoto image among the wide-angle and telephoto images, which are simultaneously captured by the imaging section 11, through the image acquisition section 22 (step S20), and performs image recognition on the first target object or the second target object close to the first target object, on the basis of the acquired telephoto image (step S22). In addition, a specific example of the image recognition in step S22 will be described later.

The output section 54 outputs the recognition information of the first target object or the second target object, which is subjected to image recognition through the image recognition section 52, to the recording section 42 or the display section 44 (step S24). Thereby, the recognition information of the first target object or the second target object can be recorded, or can be displayed.

[First Embodiment of Image Recognition]

Figure 8:
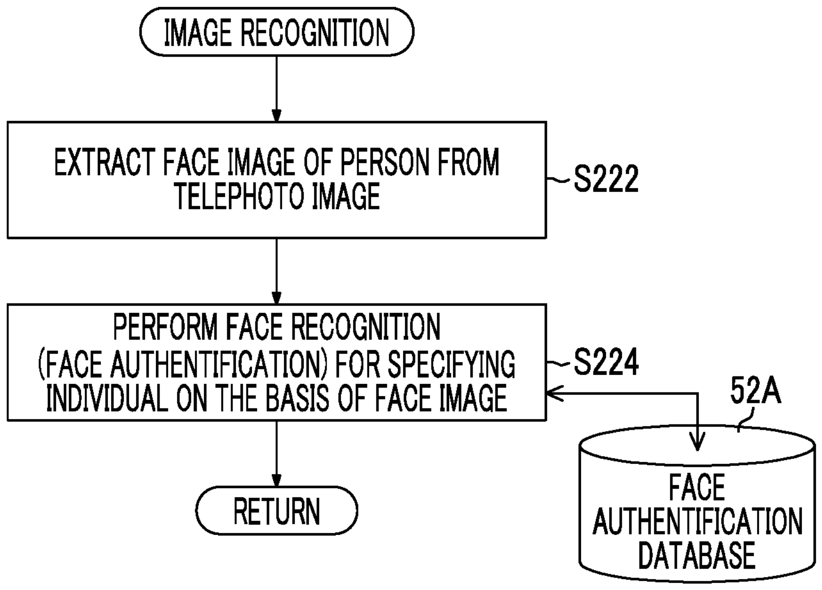
FIG. 8 is a flowchart illustrating a first embodiment of image recognition in an image recognition section.

FIG. 8 is a flowchart illustrating a first embodiment of the image recognition in the image recognition section 52, and is a diagram illustrating processing contents in step S22 shown in FIG. 7.

The first embodiment shown in FIG. 8 describes a case where the first target object is a "person" and the second target object close to the first target object is a "face" of the "person".

In FIG. 8, the image recognition section 52 extracts an image of a face F of a person P from the telephoto image T2 shown in (B2) of FIG. 6 (step S222). For extraction of the face image, it is possible to use a method of extracting a clipped image as a face image when a face evaluation value is equal to a predetermined evaluation value or more. The face evaluation value is calculated by comparing a clipped image with the face dictionary, which indicates feature quantities of the face registered in advance, while changing a position or a size thereof from the telephoto image. However, the method of extracting the face image is not limited to this.

Subsequently, on the basis of the extracted face image, face recognition (face authentication) for specifying an individual is performed (step S224). The face authentication is performed by cross-checking the extracted face image with face images (face images in which individuals are specified) of a plurality of persons who are registered in a face authentication database 52A in advance. Specifically, in the face authentication, a plurality of data pieces is obtained from the face image. Here, the data pieces include positions of feature points of face parts such as eyes, a nose, and a mouth in a face region, a distance between both eyes, a distance between eyes and a nose, such proportions, and the like. Then, the face authentication is performed on the basis of a degree of coincidence between the data pieces and the face authentication data pieces of the plurality of persons who are registered in the face authentication database 52A. In addition, the face authentication database 52A may be provided as the image recognition section 52 or an internal recording section of the imaging apparatus 10, and may be provided as an external storage section of the imaging apparatus 10.

In a case where there is a matching face in the face authentication database 52A, the image recognition section 52 is able to acquire a face image or identification information of the individual registered in the face authentication database 52A in association with the face, as recognition information (an image recognition result).

[Second Embodiment of Image Recognition]

Figure 9:
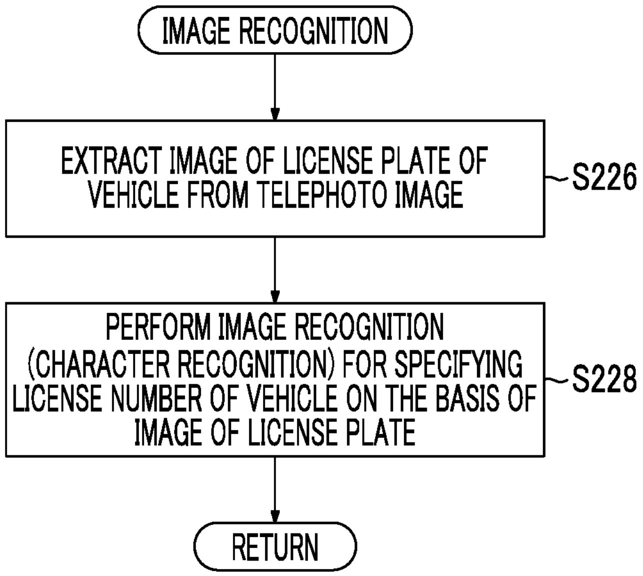
FIG. 9 is a flowchart illustrating a second embodiment of image recognition in an image recognition section.

FIG. 9 is a flowchart illustrating a second embodiment of the image recognition in the image recognition section 52, and is a diagram illustrating other processing contents in step S22 shown in FIG. 7.

Figure 10:
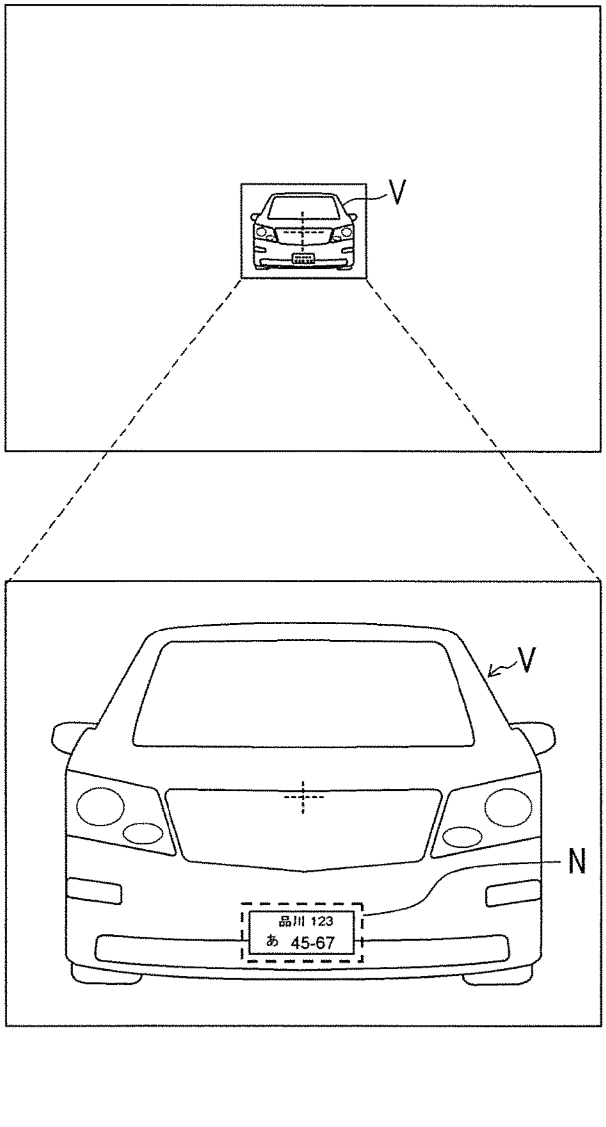
FIG. 10 is a diagram illustrating another example of a wide-angle image and a telephoto image which are captured simultaneously.

The second embodiment of the image recognition describes a case where the first target object detected through the wide-angle image is a "vehicle V" and the second target object close to the first target object (vehicle V) is a "license plate N" attached to the vehicle V as shown in (A) of FIG. 10.

As shown in (A) of FIG. 10, the vehicle V is detected from the wide-angle image, and the panning/tilting device 30 is controlled such that the vehicle V is positioned at the center of the wide-angle image (steps S10 to S18 in FIG. 7).

In FIG. 9, the image recognition section 52 extracts an image of the license plate N of the vehicle V from the telephoto image (refer to (B) of FIG. 10) when the vehicle V is positioned at the center of the wide-angle image (step S226). The extraction of the image of the license plate N can be performed using a color, pattern recognition based on a shape of the license plate N, and the like. However, a method of extracting the license plate N is not limited to this.

Subsequently, image recognition (character recognition) for specifying the license number of the vehicle V is performed on the image of the extracted image of the license plate N (step S228). The character recognition of the number can be performed through optical character recognition (OCR) software for specifying characters as a text through cross-checking between the extracted image of the license plate N and the character pattern which is stored in advance. The character information of the license plate N which is read in such a manner, the image of the license plate N, and the like can serve as recognition information (an image recognition result).

In addition, the target object of the image recognition and the contents of the image recognition are not limited to the above-mentioned embodiment, and various aspects are considered. In the present example, by performing image recognition through the telephoto image which is captured in an enlarged manner, it is possible to image recognition with higher accuracy.

Figure 11:
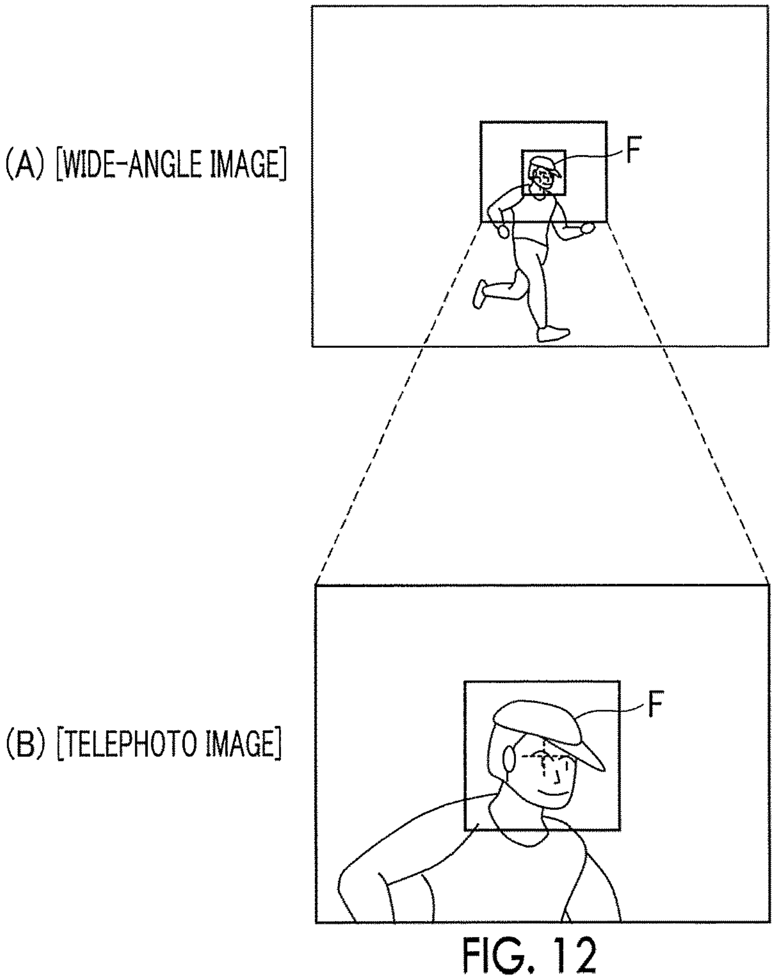
FIG. 11 is a diagram illustrating still another example of a wide-angle image and a telephoto image which are captured simultaneously.

Further, as shown in FIGS. 11(A) and 11(B), the first target object detected through the wide-angle image can be set as the "face F", and the target object, which is subjected to image recognition through the telephoto image, can be set as the "face F" which is the same as the first target object.

The image of the "face F", which is detected through the wide-angle image, may have image quality through which it can be determined whether or not the image of the first target object (face F) is present in the wide-angle image. For the image of the "face F" which is subjected to image recognition through the telephoto image, image quality capable of face authentication is necessary.

The target object, which is detected through the wide-angle image in such a manner, and the target object, which is subjected to image recognition through the telephoto image, may be the same target object.

<Case of Detecting Plurality of Objects>

Figure 12:
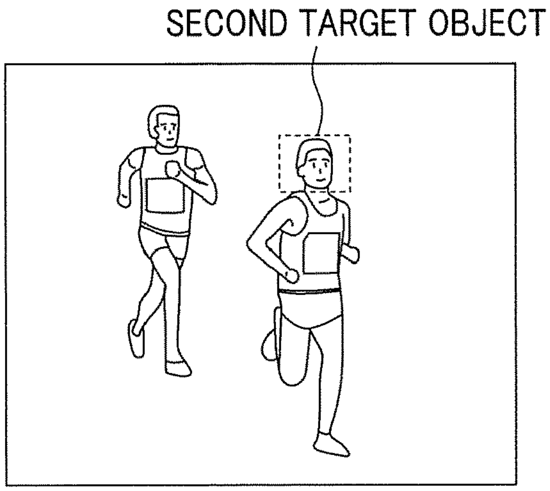
FIG. 12 is a diagram illustrating a target object which is preferentially recognized in a case where a plurality of target objects is detected.

FIG. 12 is a diagram illustrating a target object which is preferentially recognized in a case where a plurality of target objects is detected.

If the target object detection section 50 detects the plurality of target objects (in the example shown in FIG. 12, two persons), two persons are set as the first target objects. The panning/tilting control section 60 controls the panning/tilting device 30 such that the two persons (barycentric positions of the two persons) detected by the target object detection section 50 comes to the center of the telephoto image.

The image recognition section 52 performs image recognition on the telephoto image acquired by the image acquisition section 22 when the two persons are positioned at the center of the wide-angle image, but preferentially recognizes a person closest to the imaging apparatus 10 among the two persons. In a case where the plurality of target objects is persons, a face of each person is recognized, and a person whose face has a largest size can be set as the person closest to the imaging apparatus 10.

In the example shown in FIG. 12, the person on the right side in FIG. 12 is set as a target object which is preferentially subjected to image recognition, and a face of the person is set as the second target object.

Figure 13:
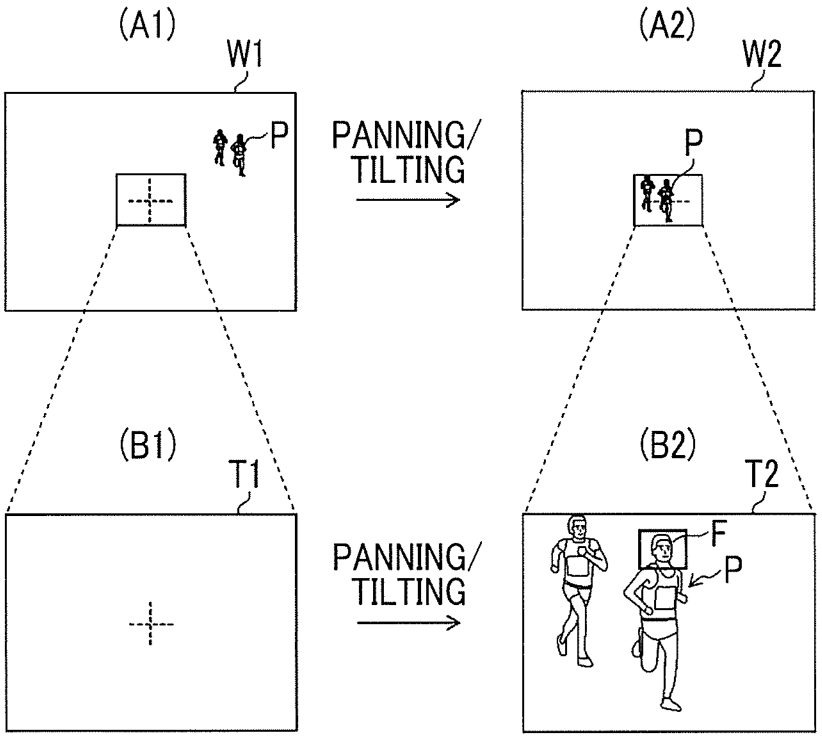
FIG. 13 is a diagram illustrating an example of a wide-angle image and a telephoto image each of which includes a target object detected as a first target object in a case where a plurality of target objects is detected.

FIG. 13 is a diagram illustrating an example of a wide-angle image and a telephoto image each of which includes a target object detected as a first target object in a case where a plurality of target objects is detected. (A1) of FIG. 13 and (B1) of FIG. 13 respectively show wide-angle and telephoto images before start of the panning/tilting control, and (A2) of FIG. 13 and (B2) of FIG. 13 respectively show the wide-angle and telephoto images before the panning/tilting control (during auto-tracking).

In an example shown in FIG. 13, in a case where the target object detection section 50 detects a plurality of target objects in the wide-angle image, the target object detection section 50 detects a target object closest to the imaging apparatus 10 as the first target object. In the example shown in FIG. 13, the target object closest to the imaging apparatus 10 (first target object) is a person P. In this case, the panning/tilting control section 60 controls the panning/tilting device 30 such that the person P detected by the target object detection section 50 is at the center of the wide-angle image.

At a time point before the start of the panning/tilting control shown in (A1) of FIG. 13 and (B1) of FIG. 13, the person P is within a wide-angle image W1, but not within a telephoto image T1.

As shown in (A2) of FIG. 13 and (B2) of FIG. 13, the panning/tilting control is performed, and thereby the person P can be captured on the basis of a telephoto image T2 if the person P is positioned at the center of a wide-angle image W2. Then, the image recognition section 52 performs image recognition on the telephoto image which is acquired by the image acquisition section 22 when the first target object (person P) is positioned at the center of the wide-angle image, and recognizes the first target object or the second target object (face F) close to the first target object.

Figure 14:
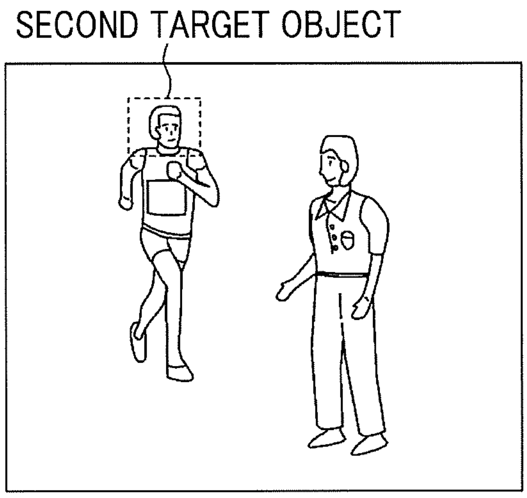
FIG. 14 is a diagram illustrating a target object which is preferentially recognized in a case where a plurality of target objects including a moving object and a stationary object is detected.

FIG. 14 is a diagram illustrating a target object which is preferentially recognized in a case where a plurality of target objects including a moving object and a stationary object is detected.

In a case where the target object detection section 50 also functioning as a moving object detection section detects the plurality of target objects, it is possible to further detect a target object as the moving object from the plurality of target objects. In the example shown in FIG. 14, the target object detection section 50 is able to separately a moving person and a stationary person.

If the target object detection section 50 detects the plurality of target objects and detects the moving object, the image recognition section 52 preferentially recognizes the detected moving object. Consequently, the image recognition section 52 prioritizes the left side person who is recognized as the moving object among the plurality of target objects (two persons in FIG. 14), and recognizes the person or a face of the person (second target object).

<Display Example in Case where Target Object is Moving Object>

As described above, the target object detection section 50 functions as a moving object detection section, and is able to detect whether or not the detected target object is a moving object or a stationary object. In a case where the target object detected by the target object detection section 50 is a moving object, if a telephoto image of the moving object is directly displayed on the display section 44, image blurring becomes large.

Accordingly, when the output section 54 functioning as an image holding section outputs recognition information of the target object, if the target object is detected as a moving object by the moving object detection section, the telephoto image is held for a predetermined time period. Thereby, by holding the telephoto image, it is possible to prevent image blurring from occurring on the telephoto image which is displayed on the display section 44. The predetermined time period may be a time period which is set in advance as a time period necessary for viewing the telephoto image, and may be a time period which is appropriately set by a user.

Further, in a case where the image recognition section 52 extracts a face image of a person from the telephoto image or extracts an image of a license plate of a vehicle from the telephoto image, the output section 54 may trim an image of the face image or the image of the license plate extracted from the telephoto image, and may output only the trimmed image to the display section 44.

If the moving target object (person or vehicle) is displayed through the telephoto image, image blurring becomes large. Accordingly, by displaying only the face image or the image of the license plate trimmed from the telephoto image on the display section 44, it is possible to prevent image blurring from occurring on the telephoto image which is displayed on the display section 44.

<Another Embodiment of Directional Sensor>

Figure 15:
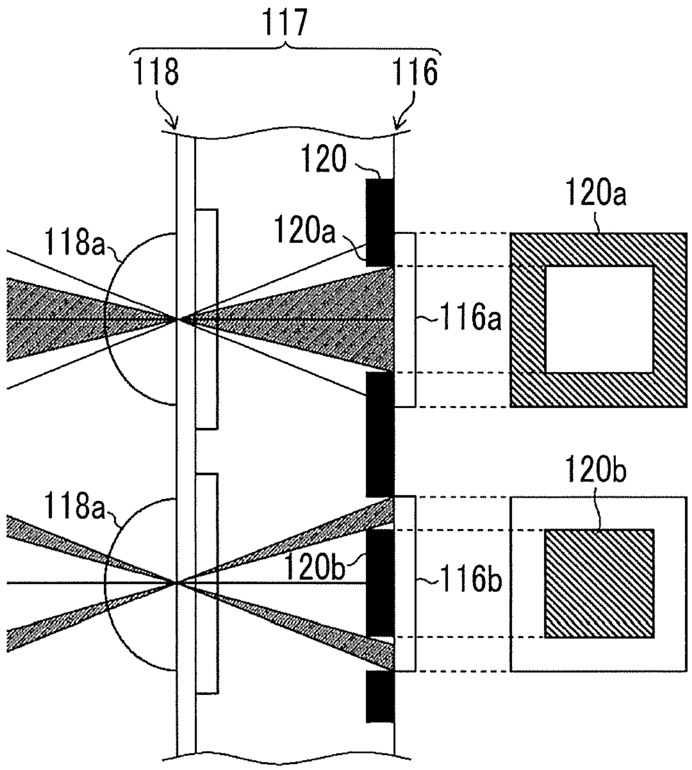
FIG. 15 is a side view illustrating another embodiment of a directional sensor.

FIG. 15 is a side view illustrating another embodiment of the directional sensor.

A directional sensor 117 includes a micro lens array 118 as pupil division means, a light blocking member 120 that functions as a light blocking mask, and an image sensor 116 in which the light receiving cells 116*a* and 116*b* are partially blocked by the light blocking member 120. In addition, the light receiving cells 116*a* and 116*b*, which are partially blocked by the light blocking member 120, are provided alternately (in a checker flag shape) in the left-right direction and up-down direction of the image sensor 116.

The micro lens array 118 has micro lenses 118*a* corresponding one-to-one with the light receiving cells 116*a* and 116*b* of the image sensor 116.

The light blocking member 120 is configured to regulate the openings of the light receiving cells 116*a* and 116*b* of the image sensor 116, and the openings have opening shapes corresponding to the wide-angle optical system 13 and the telephoto optical system 14 of the imaging optical system 12 shown in FIG. 2. In addition, color filters of red (R), green (G), and blue (B) are arranged under the lenses of the micro lens array 118.

The circumferential portion of the opening of the light receiving cell 116*a* is shielded from light by the light blocking section 120*a* of the light blocking member 120, while the central portion of the opening of the light receiving cell 116*b* is shielded from light by the light blocking section 120*b* of the light blocking member 120. Thereby, rays passing through the wide-angle optical system 13 of the imaging optical system 12 are pupil-divided by the light blocking section 120*a* of the light blocking member 120 and the micro lens array 118, and are incident onto the light receiving cell 116*a*, while rays passing through the telephoto optical system 14 of the imaging optical system 12 are pupil-divided by the light blocking section 120*b* of the light blocking member 120 and the micro lens array 118, and are incident onto the light receiving cell 116*b*.

Thereby, a pixel signal of the wide-angle image can be read from the each light receiving cell 16*a* of the image sensor 116, and a pixel signal of the telephoto image can be read from each light receiving cell 116*b* of the image sensor 116.

<Another Embodiment of Imaging Optical System>

Figure 16:
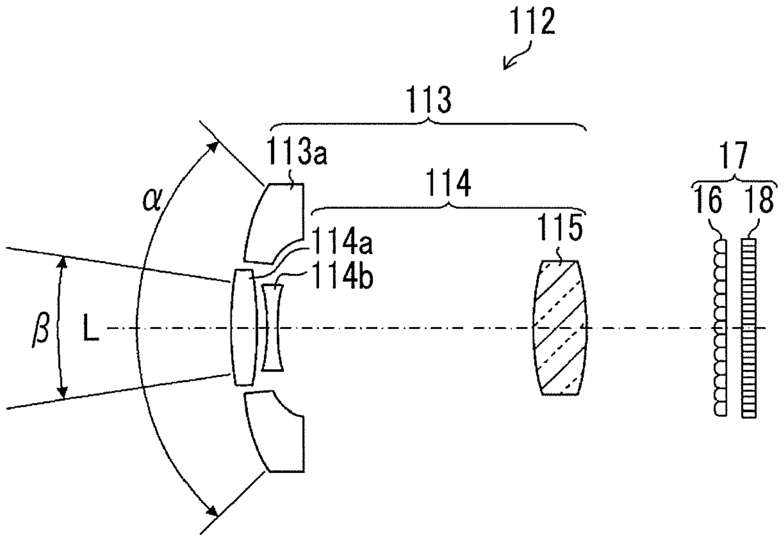
FIG. 16 is a cross-sectional view illustrating another embodiment of an imaging optical system which can be applied to the imaging apparatus.

FIG. 16 is a cross-sectional view illustrating another embodiment of an imaging optical system which can be applied to the imaging apparatus 10.

The imaging optical system 112 is formed of a wide-angle optical system 113 at the central portion and a telephoto optical system 114 having the common optical axis L. In addition, the directional sensor 17 is the same as those shown in FIGS. 2 and 3, and thus description thereof will be omitted.

The wide-angle optical system 113 (annular optical system) is a wide-angle lens including a lens 113*a* and a common lens 115, and has an angle of view α.

The telephoto optical system 114 (central optical system) is a telephoto lens including a first lens 114*a*, a second lens 114*b*, and a common lens 115, has an angle of view β (β<α), and has an angle of view narrower than that of the wide-angle optical system 113.

As compared with the imaging optical system 12 shown in FIG. 2, the imaging optical system 112 is different in that the system does not use a reflection mirror, the annular optical system is the wide-angle optical system 113, and the central optical system is the telephoto optical system 114.

<Still Another Embodiment of Imaging Optical System>

Figure 17:
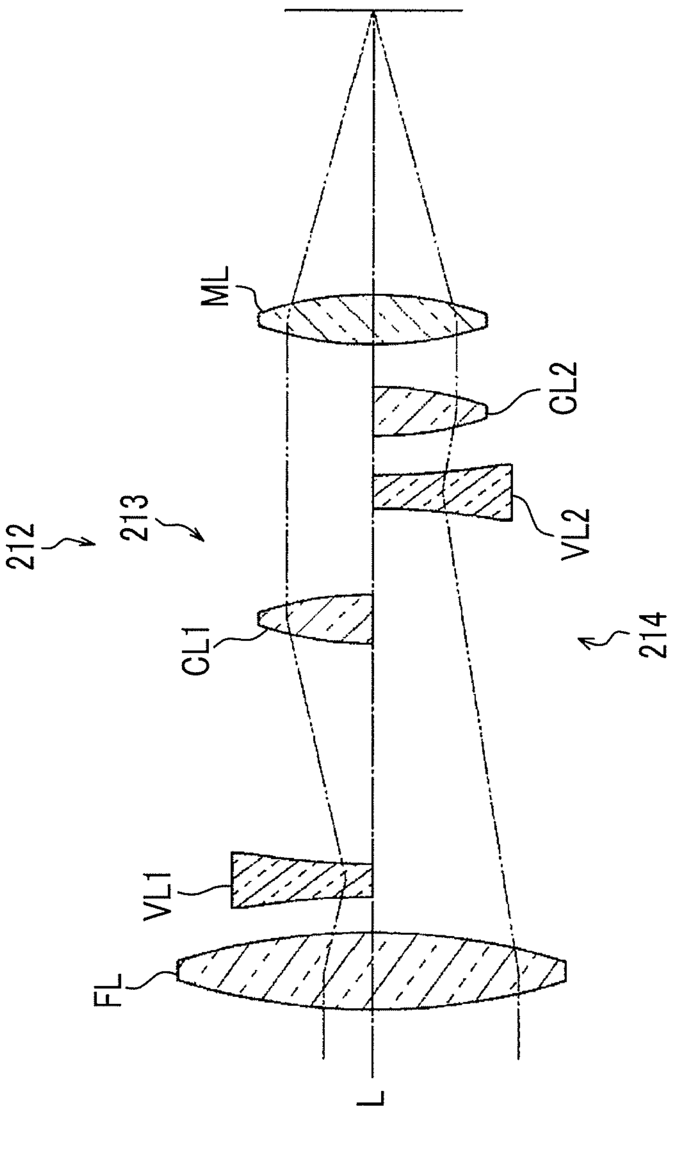
FIG. 17 is a cross-sectional view illustrating still another embodiment of an imaging optical system which can be applied to the imaging apparatus.

FIG. 17 is a cross-sectional view illustrating still another embodiment of an imaging optical system which can be applied to the imaging apparatus 10.

The imaging optical system 212 includes an upper-side wide-angle optical system 213 and a lower-side telephoto optical system 214 having the common optical axis L.

The wide-angle optical system 213 has a front lens FL, a variable magnification lens VL1, a correction system lens CL1, and an imaging system lens ML. The telephoto optical system 214 has the front lens FL, a variable magnification lens VL2, a correction system lens CL2, and the imaging system lens ML.

The front lens FL and the imaging system lens ML are common lenses in each of the wide-angle optical system 213 and the telephoto optical system 214. The variable magnification lenses VL1 and VL2 and the correction system lenses CL1 and CL2 each are divided into two parts, and are respectively disposed at different positions (positions at which wide-angle imaging is possible and positions at which telephoto imaging is possible) in the optical axis direction.

In the imaging optical system 212 having the configuration, an upper half region above the optical axis L in FIG. 17 is the wide-angle optical system 213, and a lower half region below the optical axis L is the telephoto optical system 214. In addition, it is necessary for the directional sensor applied to the imaging optical system 212 to pupil-divide rays, which pass through the upper half region (wide-angle optical system 213) of the imaging optical system 212, and rays which pass through the lower half region (telephoto optical system 214) of the imaging optical system 212, and to selectively receives the respective rays.

As described above, the wide-angle optical system and the telephoto optical system of the imaging optical system applied to the imaging apparatus according to the present invention are limited to the concentric circular optical system and the annular optical system, and may include a wide-angle optical system and a telephoto optical system having two half circular shapes divided as upper and lower (or left and right) parts.

[Others]

In the imaging apparatus 10 of the present embodiment, the panning/tilting mechanism 32, which rotates the imaging section 11 in the panning direction and the tilting direction, is provided in the apparatus main body 2. However, the present invention is not limited to this, and the entire imaging apparatus may be mounted on an electric pan head (panning/tilting device).

Further, the imaging apparatus 10 of the present embodiment is able to keep (perform auto-tracking on) the first target object at the center of the wide-angle image on the basis of the information about the position of the first target object which is detected by the target object detection section 50, and is able to perform switching to detection of another first target object if the image recognition based on the telephoto image is terminated.

In addition, the first target object may be initially set by an operator using a touch panel or the like on the basis of the wide-angle image which is displayed on the display section 44.

The reflection mirror in the reflection-mirror-type lens configuration of the imaging optical system 12 shown in FIG. 2 is not limited to a concave mirror or a convex mirror, and may be a plane mirror. Further, the number of reflection mirrors is not limited to two, and may be equal to or greater than three.

Further, the focus adjustment section may move the common lens or the image sensor of the central optical system and the annular optical system in the optical axis direction.

Furthermore, it is apparent that the present invention is not limited to the above-mentioned embodiments, and may be modified into various forms without departing from the scope of the present invention.

EXPLANATION OF REFERENCES

10: imaging apparatus
11: imaging section
12, 112, 212: imaging optical system
13, 113, 213: wide-angle optical system
14, 114, 214: telephoto optical system
16, 118: micro lens array
16*a*, 118*a*: micro lens
17, 117: directional sensor
18, 116: image sensor
18*a*, 116*a*, 116*b*: light receiving cell
22: image acquisition section
30: panning/tilting device
32: panning/tilting mechanism
42: recording section
44: display section
50: target object detection section
52: image recognition section
52A: face authentication database
54: output section
56: target object designation section
60: panning/tilting control section
120: light blocking member

What is claimed is:

1. An imaging apparatus comprising:

an imaging optical system that is formed of a wide-angle optical system and a telephoto optical system having a common optical axis;

a directional sensor that has a plurality of pixels constituted of photoelectric conversion elements two-dimensionally arranged and that respectively pupil-divides rays incident through the wide-angle and telephoto optical systems so as to selectively receive the rays;

a panning/tilting mechanism that rotates an imaging section, which includes the imaging optical system and the directional sensor, in horizontal and vertical directions;

an image acquisition section that respectively acquires a wide-angle image, for which light is received from the directional sensor through the wide-angle optical system, and a telephoto image for which light is received from the directional sensor through the telephoto optical system;

a target object detection section that detects a first target object from the wide-angle image by performing image processing on the wide-angle image acquired by the image acquisition section, wherein the target object detection section includes a moving object detection section that performs image recognition of a moving object on the basis of the wide-angle images continuously acquired by the image acquisition section, and that detects the image recognized moving object as the first target object;

a panning/tilting control section that controls the panning/tilting mechanism on the basis of information about a position of the first target object, which is detected by the target object detection section, within the wide-angle image such that the first target object is positioned at the center of the wide-angle image; and an image holding section that holds the telephoto image for a predetermined time period, if the moving object detection section detects the first target object as a moving object.

2. The imaging apparatus according to claim 1, further comprising:

an image recognition section that performs image recognition on the telephoto image, which is acquired by the image acquisition section, when the panning/tilting control section controls the panning/tilting mechanism such that the first target object is positioned at the center of the wide-angle image, and recognizes the first target object or a second target object close to the first target object; and wherein in a case where there is a plurality of the first target objects, the image recognition section preferentially recognizes the first target object closest to the imaging apparatus.

3. The imaging apparatus according to claim 1, wherein if a plurality of target objects is detected from the wide-angle image, the target object detection section detects a target object closest to the imaging apparatus as the first target object.

4. The imaging apparatus according to claim 2, further comprising wherein the target object detection section includes a moving object detection section that performs image recognition of a moving object on the basis of the wide-angle images continuously acquired by the image acquisition section, and that detects the image recognized moving object as the first target object, wherein if the target object detection section detects a plurality of target objects and the moving object detection section detects a moving object, the image recognition section preferentially recognizes the detected moving object.

5. The imaging apparatus according to claim 2, wherein the image recognition section extracts a face image of a person from the telephoto image, and performs face recognition for specifying an individual on the basis of the extracted face image.

6. The imaging apparatus according to claim 3, wherein the image recognition section extracts a face image of a person from the telephoto image, and performs face recognition for specifying an individual on the basis of the extracted face image.

7. The imaging apparatus according to claim 2, wherein the image recognition section extracts an image of a license plate of a vehicle from the telephoto image, and performs image recognition for specifying a number of the vehicle on the basis of the extracted image of the license plate.

8. The imaging apparatus according to claim 3, wherein the image recognition section extracts an image of a license plate of a vehicle from the telephoto image, and performs image recognition for specifying a number of the vehicle on the basis of the extracted image of the license plate.

9. The imaging apparatus according to claim 2, further comprising an output section that outputs recognition information of the first target object or the second target object recognized by the image recognition section.

10. The imaging apparatus according to claim 9, wherein the image recognition section extracts a face image of a person from the telephoto image, or extracts an image of a license plate of a vehicle from the telephoto image, and wherein if the image recognition section extracts the face image of the person from the telephoto image, or extracts the image of the license plate of the vehicle from the telephoto image, the output section trims the face image or the image of the license plate extracted from the telephoto image, and outputs only the trimmed image to a display section.

11. The imaging apparatus according to claim 9, wherein the output section outputs the recognition information to at least one of an information recording section, which records the recognition information, or a display section which displays the recognition information.

12. The imaging apparatus according to claim 1, further comprising an image recording section that records at least the telephoto image of the wide-angle and telephoto images acquired by the image acquisition section.

13. The imaging apparatus according to claim 1, wherein the target object detection section performs image recognition on the first target object on the basis of the wide-angle image acquired by the image acquisition section, and detects the first target object.

14. The imaging apparatus according to claim 1, wherein the target object detection section performs image processing on the wide-angle images continuously acquired by the image acquisition section in real time, and continuously detects the first target object from the wide-angle images, and wherein the panning/tilting control section continuously controls the panning/tilting mechanism on the basis of information about the position of the first target object, which is continuously detected by the target object detection section, in the wide-angle image such that the first target object is kept at the center of the wide-angle image.

15. The imaging apparatus according to claim 1, wherein the wide-angle optical system is a central optical system that has a circular shape, and the telephoto optical system is an annular optical system that is disposed concentrically around the central optical system.

16. The imaging apparatus according to claim 13, wherein the annular optical system has a reflective optical system that reflects rays twice or more.

17. The imaging apparatus according to claim 1, wherein the telephoto optical system is a central optical system that has a circular shape, and the wide-angle optical system is an annular optical system that is disposed concentrically around the central optical system.

18. The imaging apparatus according to claim 1, further comprising a focus adjustment section that performs focus adjustment of the telephoto optical system.

19. The imaging apparatus according to claim 1, wherein the directional sensor has a micro lens array or a light blocking mask that functions as pupil division means.

20. A method of recognizing a target object by using an imaging apparatus including an imaging optical system that is formed of a wide-angle optical system and a telephoto optical system having a common optical axis, a directional sensor that has a plurality of pixels constituted of photoelectric conversion elements two-dimensionally arranged and that respectively pupil-divides rays incident through the wide-angle and telephoto optical systems so as to selectively receive the rays, a panning/tilting mechanism that rotates an imaging section, which includes the imaging optical system and the directional sensor, in horizontal and vertical directions, and an image acquisition section that respectively acquires a wide-angle image, for which light is received from the directional sensor through the wide-angle optical system, and a telephoto image for which light is received from the directional sensor through the telephoto optical system, the method comprising:

detecting a first target object from the wide-angle image by performing image processing on the wide-angle image acquired by the image acquisition section;

controlling the panning/tilting mechanism on the basis of information about a position of the detected first target object within the wide-angle image such that the first target object is positioned at the center of the wide-angle image;

performing image recognition of a moving object, on the basis of the wide-angle images continuously acquired by the image acquisition section, and detecting the image recognized moving object as the first target object; and holding the telephoto image for a predetermined time period, if the first target object is detected as a moving object.

* * * * *